US012090766B2

(12) United States Patent
Kawatoko et al.

(10) Patent No.: US 12,090,766 B2
(45) Date of Patent: Sep. 17, 2024

(54) PRINTING APPARATUS, PRINTING METHOD, AND STORAGE MEDIUM

(71) Applicant: CANON KABUSHIKI KAISHA, Tokyo (JP)

(72) Inventors: Norihiro Kawatoko, Yokohama (JP); Masashi Hayashi, Yokohama (JP); Junichi Nakagawa, Tokyo (JP); Seiji Abe, Kawasaki (JP); Kentaro Muro, Tokyo (JP); Eiji Komamiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 17/141,702

(22) Filed: Jan. 5, 2021

(65) Prior Publication Data

US 2021/0122167 A1 Apr. 29, 2021

Related U.S. Application Data

(63) Continuation of application No. 16/550,679, filed on Aug. 26, 2019, now Pat. No. 10,919,314.

(30) Foreign Application Priority Data

Sep. 3, 2018 (JP) ................................ 2018-164783

(51) Int. Cl.
*B41J 29/393* (2006.01)
*B41J 2/21* (2006.01)

(52) U.S. Cl.
CPC .......... *B41J 2/2142* (2013.01); *B41J 2/2146* (2013.01); *B41J 29/393* (2013.01)

(58) Field of Classification Search
CPC .............. B41J 29/393; B41J 2029/3935; B41J 2203/01; B41J 11/0025; B41J 11/003; G06K 15/027
See application file for complete search history.

(56) References Cited

U.S. PATENT DOCUMENTS 8,950,845 B2 2/2015 Nagoshi et al.
9,411,544 B2 8/2016 Miyake et al.
(Continued)

FOREIGN PATENT DOCUMENTS

JP H04-028552 A 1/1992
JP 2012-051241 A 3/2012
(Continued)

OTHER PUBLICATIONS

Japanese Office Action dated Jun. 21, 2022, in related Japanese Patent Application No. 2018-164783 (with English translation).

*Primary Examiner* — Julian D Huffman
(74) *Attorney, Agent, or Firm* — VENABLE LLP

(57) ABSTRACT

A print medium is conveyed in a first direction and a printing head prints an image on the print medium by using a printable region of the print head that extends in a second direction crossing the first direction. Storing units can feed multiple sorts of print media. Among the multiple sorts of the print media, the print medium to print a check pattern for checking a printing state of the printing head is selected as the print medium to be fed from the corresponding storing unit. The check pattern is printed on the print medium by using a portion of the printable region of the printing head corresponding to a size of the print medium fed from the storing unit.

17 Claims, 9 Drawing Sheets

(56) References Cited

U.S. PATENT DOCUMENTS

| | | | |
|---|---|---|---|
| 9,501,249 | B2 | 11/2016 | Hori et al. |
| 2012/0050376 | A1 | 3/2012 | Nagoshi et al. |
| 2012/0229537 | A1 | 9/2012 | Ernst et al. |
| 2015/0336381 | A1 | 11/2015 | Kyoso et al. |
| 2015/0375498 | A1 | 12/2015 | Horikawa et al. |
| 2016/0031249 | A1 | 2/2016 | Akiba et al. |

FOREIGN PATENT DOCUMENTS

| | | | | | |
|---|---|---|---|---|---|
| JP | 2012166444 | A | * | 9/2012 | ............ B41J 29/393 |
| JP | 2014-197257 | A | | 10/2014 | |
| JP | 2015-000539 | A | | 1/2015 | |

* cited by examiner

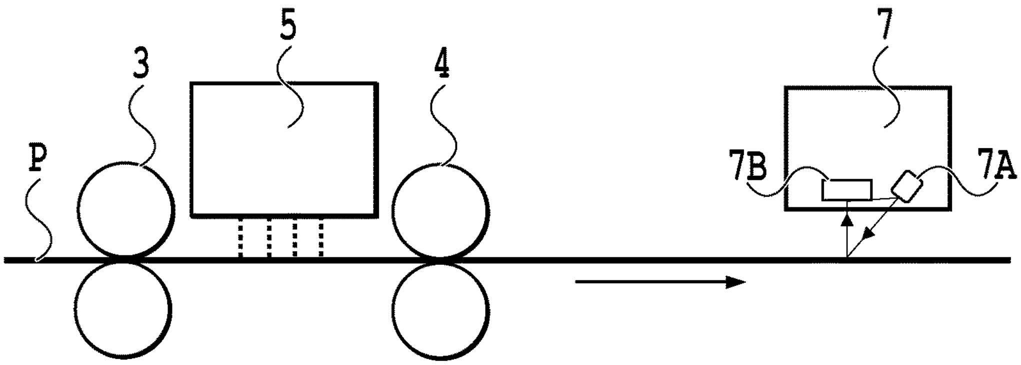
FIG.2A
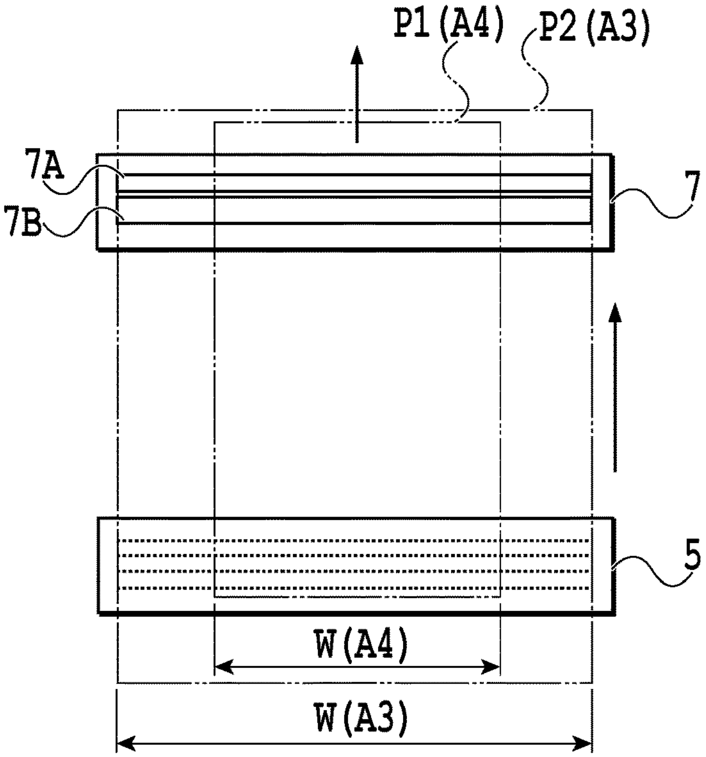
FIG.2B
| | SIZE | PRIORITY ORDER |
| --- | --- | --- |
| PRIORITY ON SIZE | A3 | 1 |
| | 11x17 (INCHES) | 2 |
| | LTR | 3 |
| | A4 | 4 |
FIG.2C

| PRIORITY MODE | | PRIORITY ORDER |
|---|---|---|
| FIRST PRIORITY MODE (PRIORITY ON SIZE) | A3 | 1 |
| | 11x17 (INCHES) | 2 |
| | LTR | 3 |
| | A4 | 4 |
| SECOND PRIORITY MODE (PRIORITY ON TYPE) | PLAIN PAPER 1 | 3 |
| | PLAIN PAPER 2 | 2 |
| | PLAIN PAPER 3 | 1 |
| | THICK PAPER 1 | – |
| | THICK PAPER 2 | – |
| | THICK PAPER 3 | – |
| | RECYCLED PAPER 1 | 6 |
| | RECYCLED PAPER 2 | 5 |
| | RECYCLED PAPER 3 | 4 |
| | COATED PAPER | – |

FIG.3

| SIZE | AUTOMATIC CORRECTION | MANUAL CORRECTION |
|---|---|---|
| 12x18 (INCHES) | × | ○ |
| A3 | ○ | ○ |
| 11x17 (INCHES) | ○ | ○ |
| LTR | ○ | ○ |
| A4 | ○ | ○ |

FIG.4B

| PRIORITY MODE | | PRIORITY ORDER |
|---|---|---|
| FIRST PRIORITY MODE (PRIORITY ON SIZE) | 12x18 (INCHES) | 1 |
| | A3 | 2 |
| | 11x17 (INCHES) | 3 |
| | LTR | 4 |
| | A4 | 5 |
| SECOND PRIORITY MODE (PRIORITY ON TYPE) | PLAIN PAPER 1 | 3 |
| | PLAIN PAPER 2 | 2 |
| | PLAIN PAPER 3 | 1 |
| | THICK PAPER 1 | – |
| | THICK PAPER 2 | – |
| | THICK PAPER 3 | – |
| | RECYCLED PAPER 1 | 6 |
| | RECYCLED PAPER 2 | 5 |
| | RECYCLED PAPER 3 | 4 |
| | COATED PAPER | – |

FIG.4C

| | AUTOMATIC CORRECTION 1 (COMMON TO SHEETS) | AUTOMATIC CORRECTION 2 (SHEET-SPECIFIC) | MANUAL CORRECTION | REPORT PRINTING |
|---|---|---|---|---|
| PRIORITY ORDER | PRIORITY ORDER A | PRIORITY ORDER B | PRIORITY ORDER A | PRIORITY ORDER C |
| 12x18 (INCHES) | × | × | ○ | × |
| A3 | ○ | ○ | ○ | × |
| 11x17 (INCHES) | ○ | ○ | ○ | × |
| LTR | ○ | ○ | ○ | ○ |
| A4 | ○ | ○ | ○ | ○ |

FIG.5A

| PRIORITY MODE | | PRIORITY ORDER A | PRIORITY ORDER B | PRIORITY ORDER C |
|---|---|---|---|---|
| FIRST PRIORITY MODE (PRIORITY ON SIZE) | 12x18 (INCHES) | 1 | – | 1 |
| | A3 | 2 | 1 | 2 |
| | 11x17 (INCHES) | 3 | 2 | 3 |
| | LTR | 4 | 3 | 4 |
| | A4 | 5 | 4 | 5 |
| SECOND PRIORITY MODE (PRIORITY ON TYPE) | PLAIN PAPER 1 | 3 | UI SELECTION | 4 |
| | PLAIN PAPER 2 | 2 | UI SELECTION | 5 |
| | PLAIN PAPER 3 | 1 | UI SELECTION | 6 |
| | THICK PAPER 1 | – | UI SELECTION | 7 |
| | THICK PAPER 2 | – | UI SELECTION | 8 |
| | THICK PAPER 3 | – | UI SELECTION | 9 |
| | RECYCLED PAPER 1 | 6 | UI SELECTION | 1 |
| | RECYCLED PAPER 2 | 5 | UI SELECTION | 2 |
| | RECYCLED PAPER 3 | 4 | UI SELECTION | 3 |
| | POSTCARD | – | – | – |
| | COATED PAPER | – | UI SELECTION | – |

FIG.5B

| | AUTOMATIC CORRECTION 1 (COMMON TO SHEETS) | AUTOMATIC CORRECTION 2 (SHEET-SPECIFIC) | MANUAL CORRECTION | REPORT PRINTING |
|---|---|---|---|---|
| PRIORITY ORDER | PRIORITY ORDER A | PRIORITY ORDER B | PRIORITY ORDER A | PRIORITY ORDER C |
| 12x18 (INCHES) | × | × | ○ | × |
| A4 | ○ | ○ | ○ | ○ |
| A3 | ○ | ○ | ○ | × |
| LTR | ○ | ○ | ○ | ○ |
| 11x17 (INCHES) | ○ | ○ | ○ | × |
| LTR(R) | ○ | ○ | ○ | ○ |
| A4(R) | ○ | ○ | ○ | ○ |

FIG.6A

| PRIORITY MODE | | PRIORITY ORDER A | PRIORITY ORDER B | PRIORITY ORDER C |
|---|---|---|---|---|
| FIRST PRIORITY MODE (PRIORITY ON SIZE) | 12x18 (INCHES) | 1 | – | – |
| | A4 | 2 | 1 | 1 |
| | A3 | 3 | 2 | – |
| | LTR | 4 | 3 | 3 |
| | 11x17 (INCHES) | 5 | 4 | – |
| | LTR(R) | 6 | 5 | 4 |
| | A4(R) | 7 | 6 | 2 |
| SECOND PRIORITY MODE (PRIORITY ON TYPE) | PLAIN PAPER 1 | 3 | UI SELECTION | 4 |
| | PLAIN PAPER 2 | 2 | UI SELECTION | 5 |
| | PLAIN PAPER 3 | 1 | UI SELECTION | 6 |
| | THICK PAPER 1 | – | UI SELECTION | 7 |
| | THICK PAPER 2 | – | UI SELECTION | 8 |
| | THICK PAPER 3 | – | UI SELECTION | 9 |
| | RECYCLED PAPER 1 | 6 | UI SELECTION | 1 |
| | RECYCLED PAPER 2 | 5 | UI SELECTION | 2 |
| | RECYCLED PAPER 3 | 4 | UI SELECTION | 3 |
| | POSTCARD | – | – | – |
| | COATED PAPER | – | UI SELECTION | – |

FIG.6B

PRINTING APPARATUS, PRINTING METHOD, AND STORAGE MEDIUM

This application is a continuation of application Ser. No. 16/550,679, filed Aug. 26, 2019.

BACKGROUND OF THE INVENTION

Field of the Invention

The present invention relates to a printing apparatus and a printing method for printing a check pattern to check a printing state and the like of a printing head, and to a storage medium storing a program for executing the printing method.

Description of the Related Art

A full-line type printing apparatus adopts a long printing head extending across the entire range in a width direction of a printable region on a print medium, and prints an image on the print medium by using the printing head while continuously conveying the print medium. In order for this printing apparatus to print a check pattern for checking a printing state in the entire region of the printing head, it is necessary to prepare a large size print medium corresponding to a maximum printable width of the printing head. Alternatively, there is also a method of using a small size print medium while changing an orientation of the print medium in conveyance (between longitudinal feeding and transverse feeding). In a case where the printable width of the printing head corresponds to a short side (297 mm) of a print medium in an A3-size (297×420 mm), namely, to the width of the A3-size print medium in longitudinal feeding, for instance, the check pattern can be printed by transversely feeding an A4-size print medium (210×297 mm).

Meanwhile, Japanese Patent Laid-Open No. 2012-051241 discloses a method in which a print medium in a size having a smaller width than a maximum printable width of a printing head is used and a check pattern is printed two or more times while changing relative positions between the print medium and the printing head.

SUMMARY OF THE INVENTION

Some users may ordinarily use print media having smaller widths than the maximum printable width of the printing head without having an opportunity to use a print medium in a large size corresponding to the maximum width of the printing head. In this case, it is burdensome for such a user to prepare a large size print medium corresponding to the maximum printable width of the printing head just for printing the check pattern.

On the other hand, it is necessary to change the relative positions between the printing head and the print medium in the case of printing the check pattern two or more times for checking the printing state in the entire region of the printing head as disclosed in Japanese Patent Laid-Open No. 2012-051241. In the case of moving the printing head, it is necessary to provide a unit for moving the printing head, which may cause complication and an increase in size of the printing apparatus. In the case of moving the print medium, it is necessary to provide a mechanism for moving the print medium in the width direction of the printing head, which may cause complication of the mechanism for conveying the print medium, an increase in size of the printing apparatus, and an increase in frequency of occurrence of print media jamming.

The present invention provides a printing apparatus, a printing method, and a storage medium, which allow selection of an appropriate print medium for printing a check pattern depending on usage conditions of the printing apparatus.

In the first aspect of the present invention, there is provided a printing apparatus comprising: a plurality of storing units each configured to store a print medium;

a feed unit capable of feeding the print medium stored in each of the storing units;

a conveyance unit configured to convey a print medium fed by the feed unit in a first direction;

a printing head capable of printing an image on the print medium conveyed by the conveyance unit, by using a printable region of the printing head extending in a second direction crossing the first direction;

a selection unit configured to perform selection of the print medium to be fed to the conveyance unit by the feed unit among the print media stored in the storing units, the selection being made in response to an instruction to print a check pattern to check a printing state of the printing head, based on information concerning sorts of the print media stored in the respective storing units, and in accordance with a priority order memorized in advance for the sorts of the print media; and a printing control unit configured to cause the printing head to print the check pattern on the print medium by using a portion of the printable region of the printing head corresponding to a size in the second direction of the print medium selected by the selection unit and fed from the feed unit.

In the second aspect of the present invention, there is provided a printing apparatus comprising:

a plurality of storing units each configured to store a print medium;

a feed unit capable of feeding the print medium stored in each of the storing units;

a conveyance unit configured to convey a print medium fed by the feed unit in a first direction;

a printing head capable of printing an image on the print medium conveyed by the conveyance unit, by using a printable region of the printing head extending in a second direction crossing the first direction;

a selection unit configured to perform selection of the print medium to be fed to the conveyance unit by the feed unit among the print media stored in the storing units, the selection being made in response to an instruction to print a check pattern to check a printing state of the printing head, based on information concerning sorts of the print media stored in the respective storing units, without an input by a user to designate the sort of the print medium; and a printing control unit configured to cause the printing head to print the check pattern on the print medium by using a portion of the printable region of the printing head corresponding to a size in the second direction of the print medium selected by the selection unit and fed from the feed unit.

In the third aspect of the present invention, there is provided a printing method of conveying a print medium contained in storing units in a first direction, and printing an image on the print medium conveyed in the first direction by using a printable region of a printing head extending in a second direction crossing the first direction, the printing method comprising:

a selecting step of performing selection of the print medium to be conveyed in the first direction among the print media stored in the storing units, the selection being made in response to an instruction to print a check pattern to check a printing state of the printing head, based on information concerning sorts of the print media stored in the respective storing units, and in accordance with a priority order memorized in advance for the sorts of the print media; and a print controlling step of causing the printing head to print the check pattern on the print medium by using a portion of the printable region of the printing head corresponding to a size in the second direction of the print medium selected by the selecting step and conveyed in the first direction.

In the fourth aspect of the present invention, there is provided a non-transitory computer readable storage medium having stored therein a program for causing a computer to execute a printing method of conveying a print medium contained in storing units in a first direction, and printing an image on the print medium conveyed in the first direction by using a printable region of a printing head extending in a second direction crossing the first direction, the printing method comprising:

a selecting step of performing selection of the print medium to be conveyed in the first direction among the print media stored in the storing units, the selection being made in response to an instruction to print a check pattern to check a printing state of the printing head, based on information concerning sorts of the print media stored in the respective storing units, and in accordance with a priority order memorized in advance for the sorts of the print media; and a print controlling step of causing the printing head to print the check pattern on the print medium by using a portion of the printable region of the printing head corresponding to a size in the second direction of the print medium selected by the selecting step and conveyed in the first direction.

According to the present invention, the selection of the print medium to print the check pattern among the multiple sorts of the print media stored in the storing units makes it possible to check the printing state of the portion of the print head, which is the portion required to be checked, while improving the convenience for a user at the same time.

Further features of the present invention will become apparent from the following description of exemplary embodiments with reference to the attached drawings.

BRIEF DESCRIPTION OF THE DRAWINGS

FIGS. 2A and 2B are explanatory diagrams of a positional relation between a printing head and a line sensor of the first embodiment of the present invention, and FIG. 2C is an explanatory diagram of a size priority table;

FIG. 3 is an explanatory diagram of another example of a print medium selection table of the first embodiment of the present invention;

FIG. 4B is an explanatory diagram of automatic correction and manual correction of printing conditions, and FIG. 4C is an explanatory diagram of a size priority table and a type priority table;

FIGS. 5A and 5B are explanatory diagrams of relations between user instructions and sizes of print media to be extracted in response thereto in a third embodiment of the present invention, respectively; and FIGS. 6A and 6B are explanatory diagrams of relations between user instructions and sizes of print media to be extracted in response thereto in a fourth embodiment of the present invention, respectively.

DESCRIPTION OF THE EMBODIMENTS

Now, embodiments of the present invention will be described below with reference to the drawings.

First Embodiment

Figure 1A:
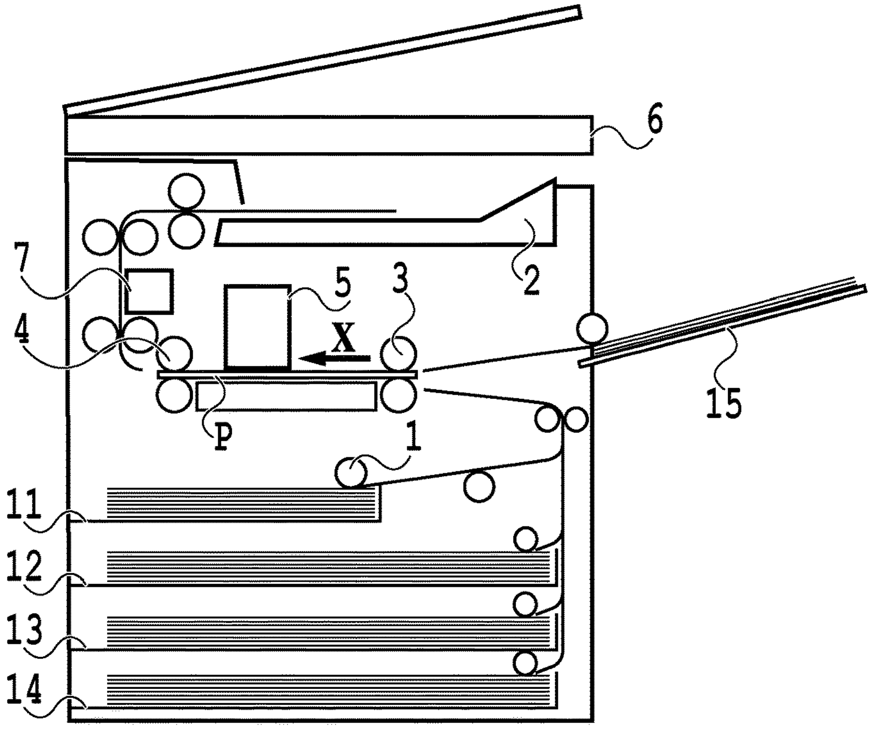
FIG. 1A is an explanatory diagram of an internal configuration of a printing apparatus according to a first embodiment of the present invention.

FIG. 1A is a diagram showing an internal configuration of an inkjet printing apparatus (a printing apparatus) according to this embodiment. The printing apparatus of this embodiment is a so-called full-line type printing apparatus that adopts a long printing head.

A print medium P fed from a feed unit 1 is conveyed at a predetermined speed in a direction of an arrow X (a conveyance direction) while being sandwiched between conveyance roller pairs 3 and 4, and is then discharged to a discharge unit 2. A printing head 5 provided between the conveyance roller pair 3 on an upstream side and the conveyance roller pair 4 on a downstream side in the conveyance direction ejects inks of four colors of black (K), cyan (C), magenta (M), and yellow (Y) to the print medium P based on printing data. The printing head 5 ejects the inks from ejection ports by using ejection energy generation elements such as electrothermal conversion elements (heaters) and piezoelectric elements. Each energy generation element and the corresponding ejection port collectively constitute an ink-ejectable nozzle serving as a printing element. The nozzles are arranged so as to form ejection port arrays that extend in a direction crossing the conveyance direction of the print medium P (at a right angle in this embodiment). Such a nozzle array is formed for each of the ink colors.

A line sensor (a reading head) 7 for reading a check pattern printed on the print medium is installed at a discharge passage for the print medium. As described later, the check pattern is a pattern to be printed on the print medium in order to check a printing state of the printing head 5, to correct various printing conditions, and so forth. It is also possible to read this check pattern by using a scanner 6 provided to the printing apparatus. In the meantime, the printing apparatus of this embodiment can feed print media from storing units located at five positions. Among them, the storing units at four positions are a first cassette 11 to storing print media in an A4 size and second, third, and fourth cassettes 12, 13, and 14 capable of storing print media up to an A3 size. The remaining storing unit at another position is a manual sheet feed slot 15 provided on a side surface of the printing apparatus, which can feed print media in an even larger size (a 12×18-inch size). The conveyance roller pairs 3 and 4 can convey the print media fed from these storing units.

The printing data are data which are generated by subjecting image data defined with RGB values corresponding to an image to be printed on the print medium P to a variety of processing including color conversion processing and quantization processing. The printing data define information on pixels on the print medium indicating whether the ink is to be ejected or not ejected onto each of the pixels.

Figure 1B:
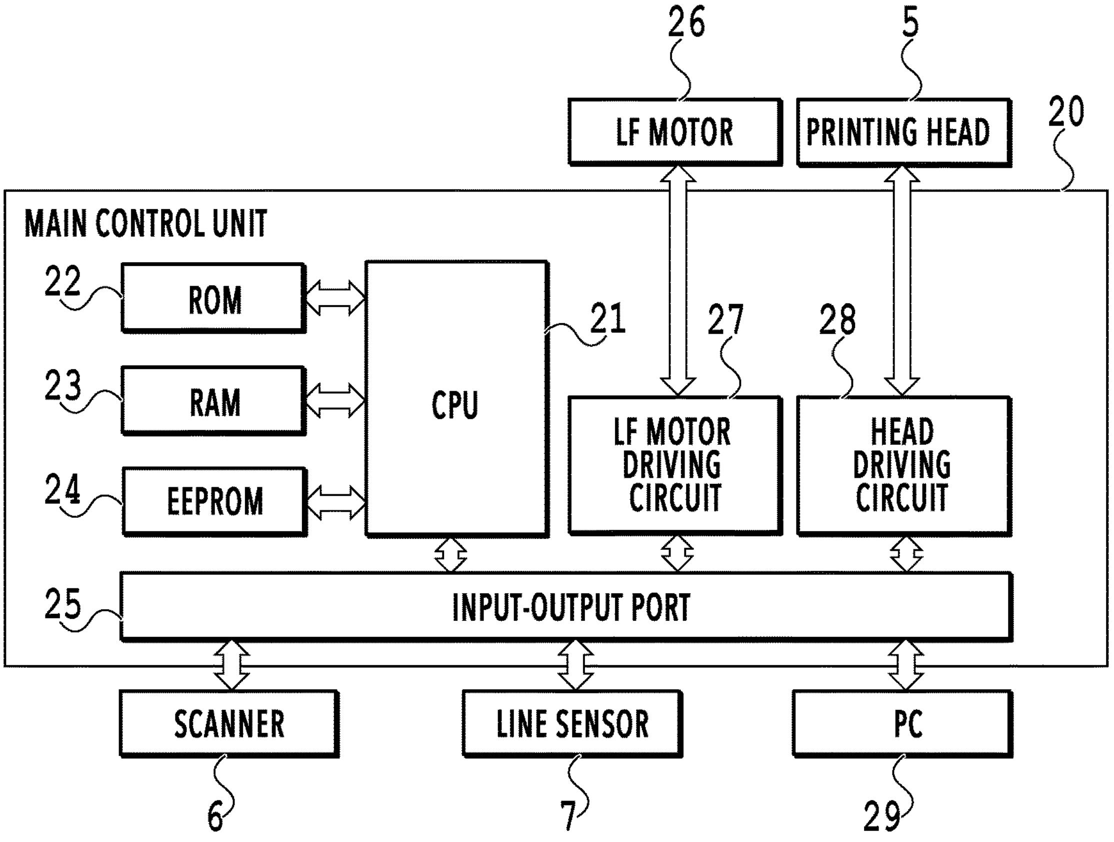
FIG. 1B is a schematic configuration diagram of a control system in the printing apparatus.

FIG. 1B is a block diagram showing a schematic configuration of a control system in the printing apparatus of this embodiment. A main control unit 20 includes a CPU (a printing control unit) 21, a ROM 22, a RAM 23, an EEPROM 24, and an input-output port 25. The CPU 21 executes processing operations including calculation, selection, determination, control, and so forth. The ROM 22 stores control programs to be executed by the CPU 21, and the like. The RAM 23 is used as a buffer for the printing data, and so forth. The EEPROM 24 stores the image data and mask patterns. Meanwhile, a driving circuit 27 to handle a conveyance motor (an LF motor) 26, a driving circuit 28 to handle the printing head 5, and the scanner 6 and the line sensor 7 each serving as a reading unit are connected to the input-output port 25. Moreover, a PC 29 serving as a host computer (a host apparatus) is connected to the main control unit 20.

In the full-line type printing apparatus as described in this embodiment, various check patterns (images for check) are printed on the print medium in order to check the printing state of the printing head 5, to correct various printing conditions, and so forth. One of the check patterns is a pattern called a nozzle check pattern, for example. The nozzle check pattern is a pattern that includes line patterns for the respective nozzles and one or more patches of uniform density so as to facilitate examination of streak flaws and density unevenness in a printed image attributable to defects in the nozzles. Meanwhile, another example of the check patterns is a color unevenness correction pattern, which is designed to measure and correct a variation in density in a printed image. The color unevenness correction pattern includes one or more tone patches. The density of each printed tone patch is determined either by using the reading unit (the scanner or the line sensor) in the printing apparatus body or by visual observation by a user. Based on a result of the determination, the printing conditions are appropriately corrected so as to reduce a variation in density in the patch at the same tone. In the meantime, another example of the check patterns is a position error detection pattern, which is designed to print nozzle-based line patterns in order to detect a degree of misalignment (a position error) in a direction of ejection of an ink droplet ejected from of each ejection nozzle. Moreover, there is another check pattern called a registration adjustment pattern for adjusting a deviation of position to form an ink dot with each of the nozzles. The registration adjustment pattern includes patterns for determining deviations of positions to form K (black) and C (cyan) ink dots, for example. The printed patterns are determined either by using the reading unit in the printing apparatus body or by visual observation by the user. Timing for the ink ejection is adjusted based on a result of the determination.

FIGS. 2A to 2C are explanatory diagrams of a method of printing a check pattern of this embodiment.

First, the CPU 21 conveys the print medium P at a constant speed toward the printing head 5 by using the conveyance roller pair 3, and causes the printing head 5 to print the check pattern on the print medium P based on the printing data. The check pattern may be any of the various patterns including the nozzle check pattern, the color unevenness correction pattern, the position error detection pattern, and the registration adjustment pattern as mentioned above. The CPU 21 causes the conveyance roller pair 4 to convey the print medium P, on which any of the check patterns cited above is printed, to a position opposed to the line sensor 7. The line sensor 7 includes a light emitter 7A and a light receiver 7B. Light emitted from the light emitter 7A is projected on a printed surface of the check pattern on the print medium P, and part of the light reflected from the printed surface is received by the light receiver 7B and converted into digital data. The CPU 21 checks the printing state of the printing head 5 based on the data on the check pattern read by the line sensor 7. Details of the checks include state checks (checks on an ink ejection state and a nozzle state corresponding to a printing density and other factors of an image in each printing tone, and the like) on printing elements arranged across the entire range in a width direction of the printed image, checks on misalignment in printing positions among printed images of the respective colors, and so forth.

FIG. 2B is a schematic diagram for explaining positional relations in the width direction among the printing head 5, the print medium P, and the line sensor, which is a diagram illustrating the printing head 5 and the line sensor 7 in FIG. 2A viewed from above. A total printable width equivalent to the printing action region (printable region) of the printing head 5 corresponds to a width W (A3) of an A3-size print medium P2, and the nozzles (the printing elements) are arrayed across the total printable width. In this embodiment, four printing element arrays (nozzle arrays) corresponding to the K, C, M, and Y inks are formed. Accordingly, in a case where a print medium P1 having an A4-size width W (A4) is fed longitudinally as shown in FIG. 2B, portions on the right and left sides in the printing action region of the printing head 5 in FIG. 2B are not used. In the meantime, a width of a reading action region (a readable width) of each of the light emitter 7A and the light receiver 7B of the line sensor 7 is set to the same width as the width W (A3) of the A3-size print medium P2.

The CPU 21 of this embodiment confirms the widths of the print media set on the printing apparatus to begin with. Examples of this confirmation method include a method of automatic detection by using sensors for detecting the sizes of the print media, a method of causing the user to input the sizes of the print media set in the printing apparatus by using an input unit of the printing apparatus, and so forth.

First Setting Example

A case of setting the A4-size print media P1 in the first cassette 11 and setting the A3-size print media P2 in the second cassette 12 will be described as a first setting example. The respective print media are set in these cassettes 11 and 12 so as to be fed longitudinally. Thus, the printing apparatus of this embodiment is set by the user in such a way as to use the A4-size and A3-size print media to be fed longitudinally.

After the CPU 21 confirms the setting of these print media, the CPU 21 selects a print medium having the largest width from the print media as a target for printing the check pattern. Examples of the selection method include a method of comparing the widths of the set print media and selecting the print medium having the largest width therefrom, and a method of restricting the sizes of the print media that allow printing of the check patterns to several sorts in advance and then selecting one of the print media from the restricted sizes. In the latter case, the print medium having the largest width is selected from the print media included in the print media having the restricted sizes and confirmed to be set in the printing apparatus. The use of check patterns associated with the print media set in the printing apparatus makes it possible to reduce the number of the check patterns to be prepared in advance and thus to save the capacity of the ROM 22 in the printing apparatus. A table in FIG. 2C is a size priority table for restricting the sizes of the print media that allow printing of the check patterns to the A3, 11×13 (inches), LTR (letter), and A4 sizes and preferentially selecting the sizes in descending order. The priority order among those print media is determined as follows, namely, the A3-size as a first rank, the 11×17 (inches) size (279.4×431.8 mm) as a second rank, the LTR (letter) size (215.9×279.4 mm) as a third rank, and the A4 size as a fourth rank. In the case where this table is used in the first setting example, the A3-size print medium P2 set in the second cassette 12 is selected as the target for printing the check pattern.

Next, the CPU 21 supplies a print medium thus selected, causes the printing head 5 to print the check pattern on the print medium, and then causes the line sensor 7 to read the check pattern. After undergoing the readout of the check pattern, the print medium is sent to the discharge unit 2.

As described above, in this embodiment, the A3-size print medium having the larger width is selected as the printing destination of the check pattern in the case where the printing apparatus is set up to use the A4-size and A3-size print media that are fed longitudinally. As a consequence, it is possible to check the printing state in terms of a portion of the printing head to be used in the case of printing an image on the A3-size and A4-size print media from a result of printing the check pattern, and to reflect the checked printing state in the various printing conditions.

Second Setting Example

A case of setting the A4-size print media P1 in both of the first and second cassettes 11 and 12 will be described as a second setting example. If the table in FIG. 2C is used in the second setting example, there is only the A4-size print medium available for printing the check pattern. Accordingly, the A4-size print medium P1 is selected and the check pattern is printed thereon. In other words, the check pattern is printed by using a portion of the printing head 5 corresponding to the width of the A4-size print medium, thus enabling detection of the printing state in terms of the portion of the printing head used for printing an image corresponding to the A4-size print medium.

If the print medium for printing the check pattern is restricted to a print medium in the A3-size or with a width larger than the A3-size due to the reason that the printable width of the printing head 5 corresponds to the width W (A3) of the A3-size print media P2, then it is not possible to print the check pattern in the second setting example. In other words, the user who only uses the A4-size print media P2 would be required to set the print medium having the A3-size or with the width larger than the A3-size. Nevertheless, this embodiment makes it possible to print the check pattern by using a more appropriate print medium out of the print media set in the printing apparatus without forcing the user to prepare a print medium in a particular size just for printing the check pattern. In the meantime, in the case where the user sets the A3-size print medium, the check pattern is printed by using the portion of the printing head 5 corresponding to the width of that print medium. In other words, the print medium serving as the printing destination of the check pattern is properly selected from the print media set in the printing apparatus, and the check pattern corresponding to the width of the selected print medium is printed thereon.

Another Example of Table

FIG. 3 is an explanatory diagram of another example of the table for setting the priority order for selection in the case of selecting the print medium to print the check pattern. This table includes the size priority table (a table of a first priority mode) of FIG. 2C for setting the priority order depending on the sizes and a type priority table (a table of a second priority mode) for setting the priority order depending on the types of the print media (paper types). The CPU 21 selects the print medium to print the check pattern by using the table of the first priority mode (hereinafter also referred to as a "first table") and the table of the second priority mode (hereinafter also referred to as a "second table").

To begin with, the CPU 21 determines the size of the print medium to print the check pattern by using the first table and then determines the type of the print medium to print the check pattern by using the second table. Specifically, in the case where the user instructs printing of the check pattern, the CPU 21 determines the size of the print medium that has a high priority in the first table among the types of the print media which are set in the printing apparatus and defined as candidates in the second table. Thereafter, the CPU 21 determines the sort of the print medium for printing the check pattern according to the priority order in the second table. To be more precise, the second table defines the priority order of the types of the print media as follows, namely, plain paper 3 as a first rank, plain paper 2 as a second rank, plain paper 1 as a third rank, recycled paper 3 as a fourth rank, recycled paper 2 as a fifth rank, and recycle paper 1 as a sixth rank. The plain paper sheets 1, 2, and 3 have different unit weights, and weigh gradually heavier in the order of the plain paper 1, the plain paper 2, and the plain paper 3. Likewise, the recycled paper sheets 1, 2, and 3 have different unit weights, and weigh gradually heavier in the order of the recycled paper 1, the recycled paper 2, and the recycled paper 3. The unit weight indicates the weight per unit area of each of the print media (paper sheets). In the print media of the same sort, one with a larger unit weight tends to have a larger thickness and higher rigidity, and to be kept from deformation more significantly.

In this embodiment, "A4-size plain paper 1" is assumed to be set in the first cassette 11, "A3-size thick paper 1" is assumed to be set in the second cassette 12, and "11×17-inch plain paper 1" is assumed to be set in the third cassette 13. In this case, the "thick paper 1" is not qualified and is therefore not extracted. As a consequence, of the "A4-size plain paper 1" in the first cassette 11 and the "11×17-inch plain paper 1" in the third cassette 13, the CPU 21 selects the latter print medium with the larger width as the printing destination of the check pattern. Meanwhile, in the case of setting "A4-size plain paper 3" and "A3-size plain paper 1", the "A3-size plain paper 1" having the larger width is selected as the printing destination of the check pattern.

As described above, the print medium for printing the check pattern is determined based on the size and the type of the print medium. In the case of this embodiment, between the plain paper and the recycled paper, the plain paper is selected on a priority basis due to its better color development property, because it is easier to accurately examine the check pattern printed on the print medium with the higher color development property than the check pattern printed on the print medium with the lower color development property, thereby enabling more reliable check of the printing state of the printing head 5. Meanwhile, in this embodiment, among the plain paper sheets 1, 2, and 3, the plain paper 3 having the larger unit weight is selected on a priority basis because the print medium with the larger unit weight has a larger thickness that can suppress a deformation such as cockling during the printing of the check pattern, thus enabling more reliable examination of the printed check pattern.

The check pattern printed on the print medium may be read out with the line sensor 7 located on a conveyance route as in this embodiment. Alternatively, the check pattern on the print medium may be read out by using the scanner 6 either built in the printing apparatus or externally provided thereto.

Second Embodiment

Figure 4A:
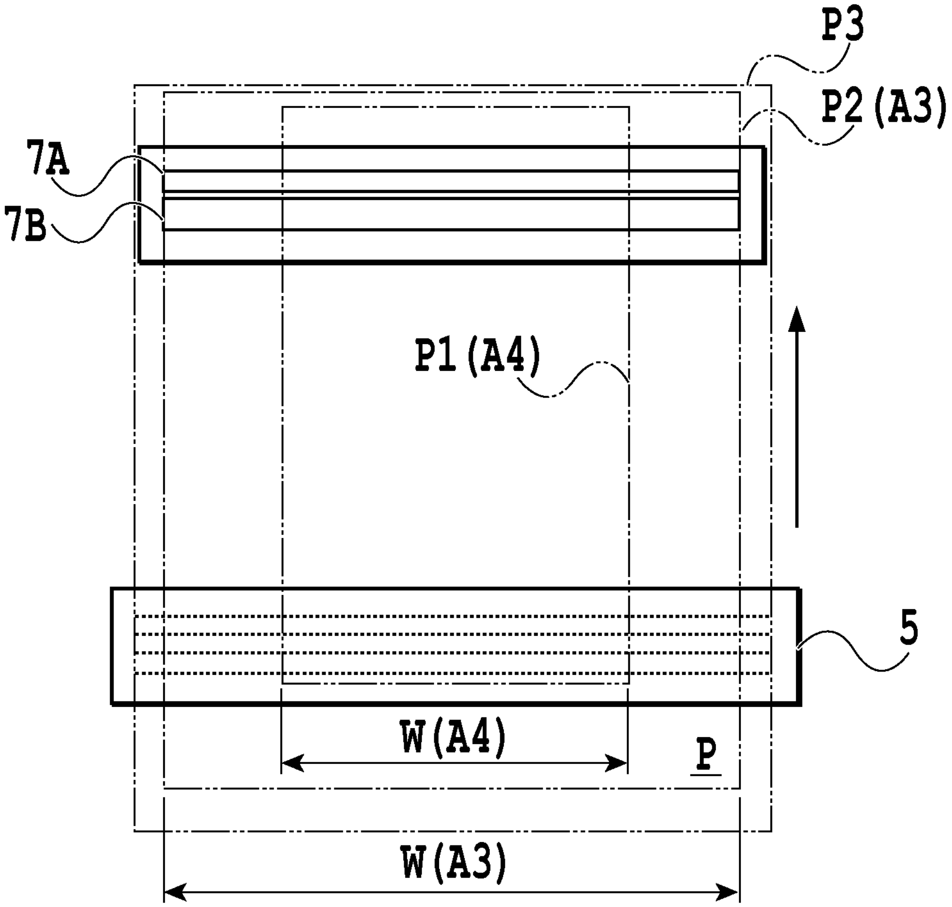
FIG. 4A is an explanatory diagram of a positional relation between a printing head and a line sensor of a second embodiment of the present invention.

FIG. 4A is a schematic diagram for explaining positional relations in the width direction among the printing head 5, the print medium P, and the line sensor 7 in this embodiment.

In this embodiment, the printable width of the printing head 5 is larger than the width W (A3) of the A3-size print medium P2 and a readable width of the line sensor 7 is equal to the width W (A3) of the A3-size print medium P2. In other words, the printable width of the printing head 5 is larger than the readable width of the line sensor 7. Popular sizes of the print media used by general users are the A3 size and the A4 size. Accordingly, the readable width of the line sensor 7 is frequently set to a width that corresponds to the width W (A3) of the A3 size and to the width W (A4) of the A4 size. In this context, the line sensor 7 that corresponds to a width other than the width W (A3) of the A3 size and to the width W (A4) of the A4 size is a special sensor and therefore causes a significant increase in cost. For this reason, there is the case where the printable width of the printing head 5 is larger than the width W (A3) of the A3-size print medium P2 and the readable width of the line sensor 7 is set equal to or below the width W (A3) of the A3-size print medium P2 as shown in FIG. 4A.

FIG. 4B is an explanatory diagram of a checking method in the case where the readable width of the printing head 5 and the width of the useable print medium P are larger than the readable width of the line sensor 7.

In this embodiment, the sizes of the print media available for printing the check pattern are assumed to include five sizes, namely, A4, LTR, 11×17-inch, A3, and 12×18-inch sizes. In the case of reading the check pattern with the line sensor 7 and the scanner 6 and correcting the various printing conditions (automatic correction), the width of the check pattern needs to be equal to or below the readable width of the line sensor 7 and the scanner 6. For this reason, in the case of the above-mentioned automatic correction, the sizes of the print media available for printing the check pattern are restricted to four sorts of the A4, LTR, 11×17-inch, and A3 sizes. On the other hand, the printing head 5 can print the check pattern on the print medium having the size up to the 12×18-inch size. Hence, the check pattern may be printed on the 12×18-inch print medium in the case of visually examining the check pattern and correcting the various printing conditions (manual correction) without using the line sensor 7, the scanner 6, and the like. Accordingly, in the case of the above-mentioned manual correction, the sizes of the print media available for printing the check pattern are deemed to include the five sizes of the A4, LTR, 11×17-inch, A3, and 12×18-inch sizes. This manual correction is useful because defects of the nozzles or color misalignment may occur at a portion of the printing head 5 outside of the readable ranges of the line sensor 7 and the scanner 6.

FIG. 4C is an explanatory diagram of a table for setting the priority order in the case of selecting the print medium as the target for printing the check pattern. This table includes the size priority table (the table of the first priority mode) for setting the priority order depending on the sizes and the type priority table (the table of the second priority mode) for setting the priority order depending on the types of the print media (the paper types). The CPU 21 selects the print medium as the target for printing the check pattern by using the table of the first priority mode (hereinafter also referred to as the "first table") and the table of the second priority mode (hereinafter also referred to as the "second table").

In the case where the user instructs to check the printing head 5, the CPU 21 confirms the sizes and the types of the print media set in the printing apparatus. Thereafter, the CPU 21 restricts the sizes of the available print media from the table in FIG. 4B depending on the correction method (the "automatic correction" or the "manual correction") applicable to the various printing conditions. In this embodiment, the print media are restricted to four sorts in the case of the "automatic correction" or are restricted to five sorts in the case of the "manual correction". Next, the CPU 21 determines the print media for printing the check pattern out of the print media in the restricted sizes according to the priority order set in the first table of FIG. 4C. Thereafter, the CPU 21 determines the type of the print medium for printing the check pattern by using the second table. Specifically, in the case where the user instructs the printing of the check pattern, the CPU 21 determines the size of the print medium having the higher priority in the first table out of the types of the print media which are set in the printing apparatus and are defined as the candidates in the second table. Thereafter, the CPU 21 determines the sort of the print medium for printing the check pattern in accordance with the priority order in the second table. If there are the print media of the same size but of different types, the appropriate print medium is selected in accordance with the priority order set in the second table in FIG. 4C.

Specifically, the "A4-size plain paper 1" is assumed to be set in the first cassette 11, the "A3-size plain paper 1" is assumed to be set in the second cassette 12, and "12×18-inch plain paper 1" is assumed to be set in the manual sheet feed slot 15. In this case, if the user sets up the "automatic correction", the 12×18-inch size is excluded from the candidate according to the table in FIG. 4B. As a consequence, the "A3-size plain paper 1" in the second cassette 12 is determined as the printing destination of the check pattern. On the other hand, if the user sets up the "manual correction", the "12×18-inch plain paper 1" in the manual sheet feed slot 15 is determined as the printing destination of the check pattern. As described above, it is possible to select the most appropriate print medium as the target for printing the check pattern depending on the correction method applicable to the various printing conditions.

Third Embodiment

FIGS. 5A and 5B are diagrams for explaining a third embodiment of the present invention. FIG. 5A is an explanatory diagram of a relation between the instruction by the user and the size of the print medium to be extracted in response thereto. This embodiment includes automatic correction 1 (common to sheets) and automatic correction 2 (sheet-specific) as the modes of automatic correction described in the foregoing embodiment. Meanwhile, the priority order in the case of the automatic correction 1 and the manual correction is defined as the "priority order A", the priority order in the case of the automatic correction 2 is defined as the "priority order B", and the priority order in the case of report printing to be described later is defined as the "priority order C". Moreover, in this embodiment, "A4-size coated paper" is assumed to be set in the first cassette 11, the "A3-size plain paper 1" is assumed to be set in the second cassette 12, and "LTR coated paper" is assumed to be set in the manual sheet feed slot 15.

In the case where the user sets up the automatic correction 1 (common to sheets), the CPU 21 determines the size of the print medium for printing the check pattern based on the first table (the table of the first priority mode) in FIG. 5B. Thereafter, the CPU 21 determines the type of the print medium for printing the check pattern based on the second table (the table of the second priority mode) in FIG. 5B. In this embodiment, the "plain paper" set in the printing apparatus is the "A3-size plain paper 1" in the second cassette 12, and no "recycle paper" is set in the printing apparatus. Meanwhile, in the table in FIG. 5A, the "A3" size is set as a size that can be restricted in the case of the automatic correction 1 (common to sheets). As a consequence, the "A3-size plain paper 1" in the second cassette 12 is selected as the printing destination of the check pattern in this embodiment.

Next, a description will be given of a case in which the user sets up the automatic correction 2 (sheet-specific). In the automatic correction 2 (sheet-specific), it is possible to print the check pattern on the print medium selected by the user and to correct the various printing conditions for each print medium (for each sheet) based on the result of reading the check pattern. This check pattern may be different from the check pattern applicable to the check patterns in the case of the automatic correction (inclusive of the automatic correction 1 and 2) and the "manual correction", or may be a pattern that varies depending on the print media selected by the user. In the case where the user sets up the automatic correction 2 (sheet-specific), the CPU 21 causes the user to select the print medium for printing the check pattern. In this case, the types (the paper types) of the print media selectable by the user are restricted to the types set to "UI selection" in the second table (the table of the second priority mode) in FIG. 5B.

In the case where the user selects the "coated paper", for example, the CPU 21 confirms whether or not the "coated paper" is set in the printing apparatus. In this embodiment, the "A4-size coated paper" is set in the first cassette 11 and the "LTR coated paper" is set in the manual sheet feed slot 15. Hence, based on the table in FIG. 5A, the CPU 21 confirms whether not the sizes of the "coated paper" sheets are applicable. Since those print media have the applicable sizes ("A4" and "LTR"), the size of the print medium as the printing destination of the check pattern is determined in accordance with the priority order set in the first table in FIG. 5B. In this embodiment, the "LTR coated paper" in the manual sheet feed slot 15 is determined as the print medium for printing the check pattern.

In the above-described embodiment, the print medium having the size with the larger width is basically selected on a priority basis as the print medium targeted for printing the check pattern. On the other hand, however, the print medium having the size with the smaller width may be selected on a priority basis depending on the check pattern. For example, in a case where a report showing the printing state of the printing apparatus is printed as the check pattern, it is preferable to use a print medium in a smaller size and at a lower cost on a priority basis because it is not necessary to print the check pattern that extends across the printable width of the printing head. In FIGS. 5A and 5B, the priority order in terms of the size and type of the print media as the printing destination is set up while defining this report as the check pattern. In this way, it is possible to use the sort of the print medium small in size and low in cost can be used on a priority basis.

Fourth Embodiment

FIGS. 6A and 6B are explanatory diagrams of a method of printing a check pattern according to a fourth embodiment of the present invention. In this embodiment, the print medium for printing the check pattern is selected based on an orientation of the print medium in conveyance (longitudinal feeding and transverse feeding).

The foregoing first to third embodiments have described the "A4" and "LTR" print media as the longitudinally fed print media. Meanwhile, this embodiment will describe the case in which the transversely fed "A4" print medium is defined as "A4", the longitudinally fed "A4" print medium is defined as "A4(R)", the transversely fed "LTR" print medium is defined as "LTR", and the longitudinally fed "LTR" print medium is defined as "LTR(R)", respectively. In the transverse feeding of the print media, a length in a conveyance direction of each print medium becomes shorter and a conveyance distance therefore becomes shorter. Accordingly, it is possible to increase the number of printing the print media per unit time at the same conveyance speed. Meanwhile, in this embodiment, "A4(R) (longitudinally fed) plain paper 1" is assumed to be set in the first cassette 11, "A4 (transversely fed) plain paper 1" is assumed to be set in the second cassette 12, and "A3 (transversely fed) plain paper 1" is assumed to be set in the third cassette 13.

In the case where the user sets up the automatic correction 1 (common to sheets), the CPU 21 extracts the "plain paper" or the "recycled paper" as the print medium serving as the printing destination of the check pattern based on the second table (the table of the second priority mode) in FIG. 6B. In this embodiment, the "plain paper" set in the printing apparatus includes the "A4(R) (longitudinally fed) plain paper 1" in the first cassette 11, the "A4 (transversely fed) plain paper 1" in the second cassette 12, and the "A3 (transversely fed) plain paper 1" in the third cassette 13. No "recycled paper" is set in the printing apparatus. Meanwhile, in the table in FIG. 6A, the "A4(R) (longitudinally fed)", "A4 (transversely fed)", and "A3 (transversely fed)" sizes are set as sizes that are available in the case of setting the automatic correction 1 (common to sheets). Therefore, the CPU 21 determines the size of the print medium in accordance with the priority order set in the first table (the table of the first priority mode) in FIG. 6B. In this embodiment, the "A4 (transversely fed) plain paper 1" in the second cassette 12 is determined as the print medium for printing the check pattern.

In the case where the user sets up the automatic correction 2 (sheet-specific), the CPU 21 causes the user to select the print medium serving as the printing destination of the check pattern out of the types set as the "UI selection" in the second table in FIG. 6B as with the above-described embodiment. The CPU 21 confirms whether or not the print medium of the selected type is set in the printing apparatus. If the selected type is set in the printing apparatus, the CPU 21 selects the print medium serving as the printing destination of the check pattern in accordance with the priority order set in the first table in FIG. 6B. In this embodiment, in the case where the "plain paper" is designated by the user, the "A4 (transversely fed) plain paper 1" in the second cassette 12 is selected as the print medium for printing the check pattern.

In the meantime, it is possible to print the check pattern in the form of a report as with the third embodiment. In this case, the print media as the printing targets include the "A4 (transversely fed) plain sheet 1" and the "LTR (transversely fed)".

Regarding the set of the A4-size and A3-size print media and the set of the LTR and 11×17 (inches) print media each having the same printable width depending of the combination of the longitudinal feeding and the transverse feeding, the A4 size or the LTR is selected on the priority basis in this embodiment because each sheet of the A4-size and LTR print media has a lower cost than the corresponding one of the A3-size and 11×17 (inches) print media. However, one of the A3-size and 11×17 (inches) print media may be selected on the priority basis on the other way around because there may be a case where a certain check pattern would require two or more sheets if printed on any of the A4-size and LTR print media. What is more, there may also be a case where it is not possible to print a certain check pattern while keeping off a region at a tip end or a tail end of the smaller print medium which is likely to be involved in conveyance instability.

Moreover, the selection of the print medium for printing the check pattern while taking into account the conveyance direction (the longitudinal feeding and the transverse feeding) of the print media as described in this embodiment makes it possible to suppress a deformation of the print medium during the printing of the check pattern.

Incidentally, arrangement of fibers that form the print medium such as the plain paper has an orientation. In general, the direction of arrangement of the fibers is parallel to the long side of the print medium. For this reason, a deformation in the direction of a short side is prone to develop in the case where the check pattern is printed by transversely feeding the A4-size print medium in order to check the printing state in the entire region of the printing head. The above-mentioned deformation is prone to cause the print medium to come into contact with the printing head, or to cause the print medium to curl up after the printing of the check pattern which may complicate the discharge of the print medium. In particular, the above-mentioned displacement becomes conspicuous in the case of using the inkjet printing head that ejects inks containing water. Hence, the selection of the print medium for printing the check pattern while taking into account the conveyance direction (the longitudinal feeding and the transverse feeding) of the print media as described in this embodiment makes it possible to suppress the deformation of the print medium during the printing of the check pattern.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164783 filed Sep. 3, 2018, which is hereby incorporated by reference herein in its entirety.

What is claimed is:

1. A printing apparatus comprising:

a first cassette configured to store a print medium;

a second cassette configured to store a print medium;

a first feeder capable of feeding a print medium stored in the first cassette;

a second feeder capable of feeding a print medium stored in the second cassette;

a conveyor configured to convey a print medium fed by one of a plurality of feeders including the first cassette and the second cassette in a first direction;

a printing head extending in a second direction crossing the first direction and capable of printing an image on a print medium conveyed by the conveyor, by using a printable region of the printing head; and a controller configured to control the printing head to:

print a check pattern for checking a printing state of the printing head on the print medium fed by the first feeder or the second feeder, by using a portion of the printable region of the printing head corresponding to a size in the second direction of the print medium fed from the first cassette or the second cassette, without relative movement between the printing head and the printing medium in the second direction, and in a case where the first cassette stores a print medium of which a size in the second direction is a first size and the second cassette stores a print medium of which a size in the second direction is a second size larger than the first size, the controller is configured to control the apparatus such that the second feeder feeds the print medium of which the size in the second direction is the second size and the printing head prints the check pattern on the print medium of which the size in the second direction is the second size for checking the printing state in terms of a portion of the printing head to be used in the case of printing an image on a print medium of which the size in the second direction is the second size, and in a case where the first cassette stores a print medium of which a size in the second direction is the first size and the second cassette stores a print medium of which a size in the second direction is the first size or a third size smaller than the first size, the controller is configured to control the apparatus such that the first feeder feeds the print medium of which the size in the second direction is the first size and the printing head prints the check pattern on the print medium of which the size in the second direction is the first size, without using a portion of the printing head which portion is not to be used in a case of printing an image which is not the check pattern on a single print medium of which the size in the second direction is the first size, for checking the printing state in terms of a portion of the printing head which portion is to be used in the case of printing the image on the print medium of which the size in the second direction is the first size.

2. The printing apparatus according to claim 1, wherein in a case where the first cassette stores a print medium of A4-size such that the print medium of A4-size is fed by the first feeder in a long side direction of the print medium of A4-size and the second cassette stores a print medium of A3-size, the second feeder feeds the print medium of A3-size and the printing head prints the check pattern on the print medium of the A3-size.

3. The printing apparatus according to claim 2, wherein the second feeder feeds the print medium of A3-size from the second cassette in a long side direction of the print medium of A3-size.

4. The printing apparatus according to claim 1, wherein in a case where the first cassette stores a print medium of A4-size such that the print medium of A4-size is fed by the first feeder in a short side direction of the print medium of A4-size and the second cassette stores a print medium of A3-size such that the print medium of A3-size is fed by the second feeder in a long side direction of the print medium of A3-size, the second feeder feeds the print medium of A3-size and the printing head prints the check pattern on the print medium of the A3-size.

5. The printing apparatus according to claim 1, wherein in a case where the first cassette stores a print medium of which a size in the second direction is a first size and having a first color development property and the second cassette stores a print medium of which a size in the second direction is the first size and having a second color development property lower than the first color development property, the first feeder feeds the print medium of which the size in the second direction is the first size and having the first color development property and the printing head prints the check pattern on the print medium of which the size in the second direction is the first size and having the first color development property.

6. The printing apparatus according to claim 1, wherein in a case where the first cassette stores recycle paper of which a size in the second direction is a first size and the second cassette stores plain paper of which a size in the second direction is the first size, the second feeder feeds the plain paper of which the size in the second direction is the first size and the printing head prints the check pattern on the plain paper of which the size in the second direction is the first size.

7. The printing apparatus according to claim 1, wherein in a case where the first cassette stores a print medium of which a size in the second direction is a first size and having a first unit weight and the second cassette stores a print medium of which a size in the second direction is the first size and having a second unit weight lower than the first unit weight, the first feeder feeds the print medium of which the size in the second direction is the first size and having the first unit weight and the printing head prints the check pattern on the print medium of which the size in the second direction is the first size and having the first unit weight.

8. The printing apparatus according to claim 1, further comprising a reader capable of reading the check pattern printed on a print medium by the printing head.

9. The printing apparatus according to claim 8, wherein the reader is provided with a readable region extending in the second direction, and is located downstream of the printing head in the first direction, and the reader reads the check pattern printed on the print medium by the printing head within the readable region.

10. The printing apparatus according to claim 9, wherein the readable region of the reader has a smaller width in the second direction than the printable region of the printing head, (i) in a case where the reader is used to read the check pattern, the check pattern is printed on a print medium having a width in the second direction equal to or below the readable region, and (ii) in a case where the reader is not used to read the check pattern, the check pattern is printed on a print medium having a width in the second direction larger than the readable region.

11. The printing apparatus according to claim 1, further comprising sensors configured to detect sorts of print media stored in the first cassette and the second cassette.

12. The printing apparatus according to claim 1, further comprising an input configured to allow a user to input information concerning sorts of the print media stored in the cassettes.

13. The printing apparatus according to claim 1, wherein the check pattern is a pattern including line patterns for respective nozzles or a pattern including one or more patches of uniform density.

14. The printing apparatus according to claim 1, further comprising a scanner configured to read an image, and a discharge unit configured so that a print medium is discharged to the discharge unit, wherein the discharge unit is located between the scanner and the printing head.

15. A printing method by a printing apparatus which comprises a first cassette configured to store a print medium, a second cassette configured to store a print medium, a conveyor configured to convey a print medium stored in one of a plurality of cassettes including the first cassette and the second cassette in a first direction, and a printing head extending in a second direction crossing the first direction and capable of printing an image by using a printable region of the printing head on a print medium conveyed by the conveyor, the printing method comprising the steps of:

feeding a print medium stored in the first cassette or the second cassette;

conveying the print medium fed by the feeding step in the first direction, and printing a check pattern for checking a printing state of the printing head on the print medium conveyed by the conveying step without relative movement between the printing head and the printing medium in the second direction, wherein in a case where the first cassette stores a print medium of which a size in the second direction is a first size and the second cassette stores a print medium of which a size in the second direction is a second size larger than the first size, the print medium of which the size in the second direction is the second size is fed from the second cassette in the feeding step and the check pattern is printed by the printing head on the print medium of which the size in the second direction is the second size for checking the printing state in terms of a portion of the printing head to be used in the case of printing an image on a print medium of which the size in the second direction is the second size, and in a case where the first cassette stores a print medium of which a size in the second direction is the first size and the second cassette stores a print medium of which a size in the second direction is the first size or a third size smaller than the first size, the print medium of which the size in the second direction is the first size is fed from the second cassette in the feeding step and the check pattern is printed by the printing head on the print medium of which the size in the second direction is the first size, without using a portion of the printing head which portion is not to be used in a case of printing an image which is not the check pattern on a single print medium of which the size in the second direction is the first size, for checking the printing state in terms of a portion of the printing head which portion is to be used in the case of printing the image on the print medium of which the size in the second direction is the first size in the printing step.

16. A printing apparatus comprising:

a first cassette configured to store a print medium;

a second cassette configured to store a print medium;

a first feeder capable of feeding a print medium stored in the first cassette;

a second feeder capable of feeding a print medium stored in the second cassette;

a conveyor configured to convey a print medium fed by one of a plurality of feeders including the first cassette and the second cassette in a first direction;

a printing head extending in a second direction crossing the first direction and capable of printing an image on a print medium conveyed by the conveyor, by using a printable region of the printing head; and a controller configured to control the printing head to:

print a check pattern for initiating and completing a printing state check of the printing head on the print medium fed by the first feeder or the second feeder, by using only a portion of the printable region of the printing head corresponding to a size in the second direction of the print medium fed from the first cassette or the second cassette, without relative movement between the printing head and the printing medium in the second direction, in a case where the first cassette stores a print medium of which a size in the second direction is a first size and the second cassette stores a print medium of which a size in the second direction is a second size larger than the first size, the controller is configured to control the apparatus such that the second feeder feeds the print medium of which the size in the second direction is the second size and the printing head prints the check pattern on the print medium of which the size in the second direction is the second size for checking the printing state in terms of a portion of the printing head to be used in the case of printing an image on a print medium of which the size in the second direction is the second size, and in a case where the first cassette stores a print medium of which a size in the second direction is the first size and the second cassette stores a print medium of which a size in the second direction is the first size or a third size smaller than the first size, the controller is configured to control the apparatus such that the first feeder feeds the print medium of which the size in the second direction is the first size and the printing head prints the check pattern on the print medium of which the size in the second direction is the first size, without using a portion of the printing head which portion is not to be used in a case of printing an image which is not the check pattern on the print medium of which the size in the second direction is the first size, for checking the printing state in terms of a portion of the printing head which portion is to be used in the case of printing the image on the print medium of which the size in the second direction is the first size.

17. A printing method by a printing apparatus which comprises a first cassette configured to store a print medium, a second cassette configured to store a print medium, a conveyor configured to convey a print medium stored in one of a plurality of cassettes including the first cassette and the second cassette in a first direction, and a printing head extending in a second direction crossing the first direction and capable of printing an image by using a printable region of the printing head on a print medium conveyed by the conveyor, the printing method comprising the steps of:

feeding a print medium stored in the first cassette or the second cassette;

conveying the print medium fed by the feeding step in the first direction, and printing a check pattern for initiating and completing a printing state check of the printing head on the print medium conveyed by the conveying step by using a portion of the printable region of the printing head corresponding to a size in the second direction of the print medium fed from the first cassette or the second cassette, without relative movement between the printing head and the printing medium in the second direction, wherein in a case where the first cassette stores a print medium of which a size in the second direction is a first size and the second cassette stores a print medium of which a size in the second direction is a second size larger than the first size, the print medium of which the size in the second direction is the second size is fed from the second cassette in the feeding step and the check pattern is printed by the printing head on the print medium of which the size in the second direction is the second size for checking the printing state in terms of a portion of the printing head to be used in the case of printing an image on a print medium of which the size in the second direction is the second size, and in a case where the first cassette stores a print medium of which a size in the second direction is the first size and the second cassette stores a print medium of which a size in the second direction is the first size or a third size smaller than the first size, the print medium of which the size in the second direction is the first size is fed from the second cassette in the feeding step and the check pattern is printed by the printing head on the print medium of which the size in the second direction is the first size, without using a portion of the printing head which portion is not to be used in a case of printing an image which is not the check pattern on a single print medium of which the size in the second direction is the first size, for checking the printing state in terms of a portion of the printing head which portion is to be used in the case of printing the image on the print medium of which the size in the second direction is the first size in the printing step.

* * * * *